June 16, 1953 W. C. BAYNES 2,642,182
GREETING CARD AND ENVELOPE ASSEMBLY
Filed Oct. 23, 1947 4 Sheets-Sheet 1
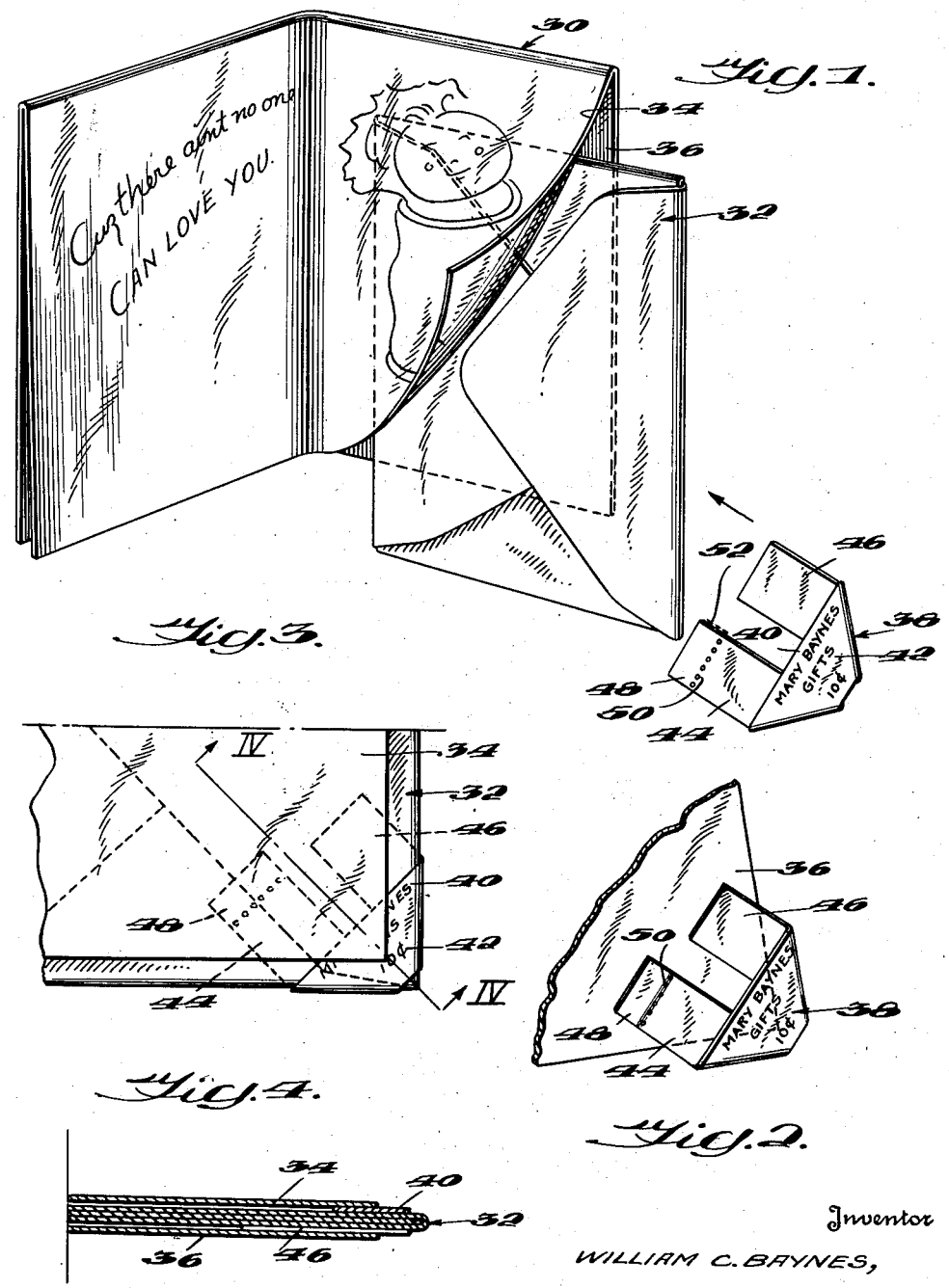
Inventor
WILLIAM C. BAYNES,
By Leech & Radue
Attorneys June 16, 1953 W. C. BAYNES 2,642,182
GREETING CARD AND ENVELOPE ASSEMBLY
Filed Oct. 23, 1947 4 Sheets-Sheet 2
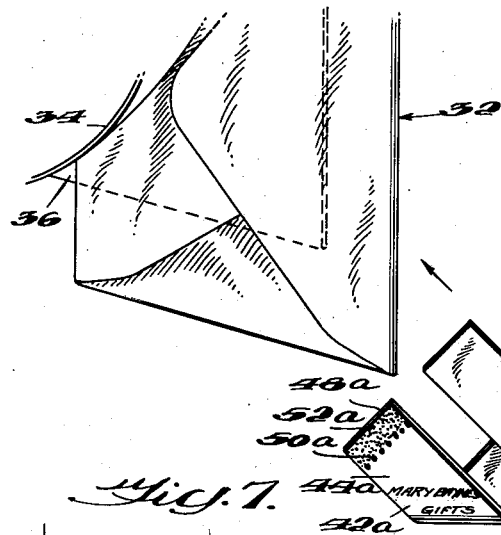
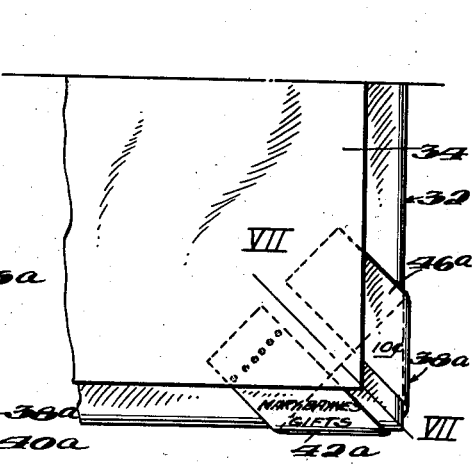
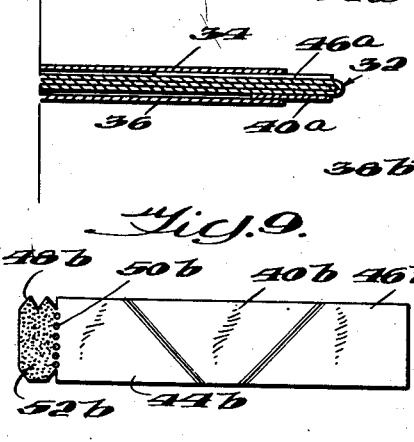
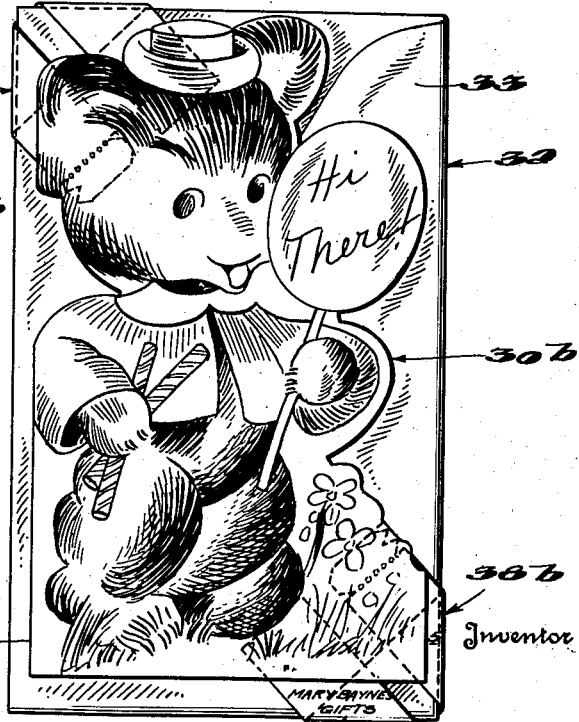
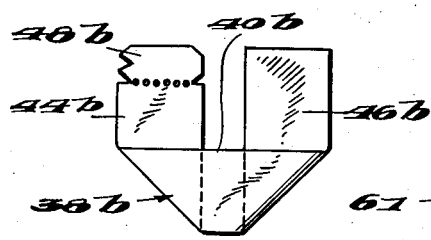
Inventor
WILLIAM C. BAYNES,
By Leech & Radue
Attorneys June 16, 1953 W. C. BAYNES 2,642,182
GREETING CARD AND ENVELOPE ASSEMBLY
Filed Oct. 23, 1947 4 Sheets-Sheet 3
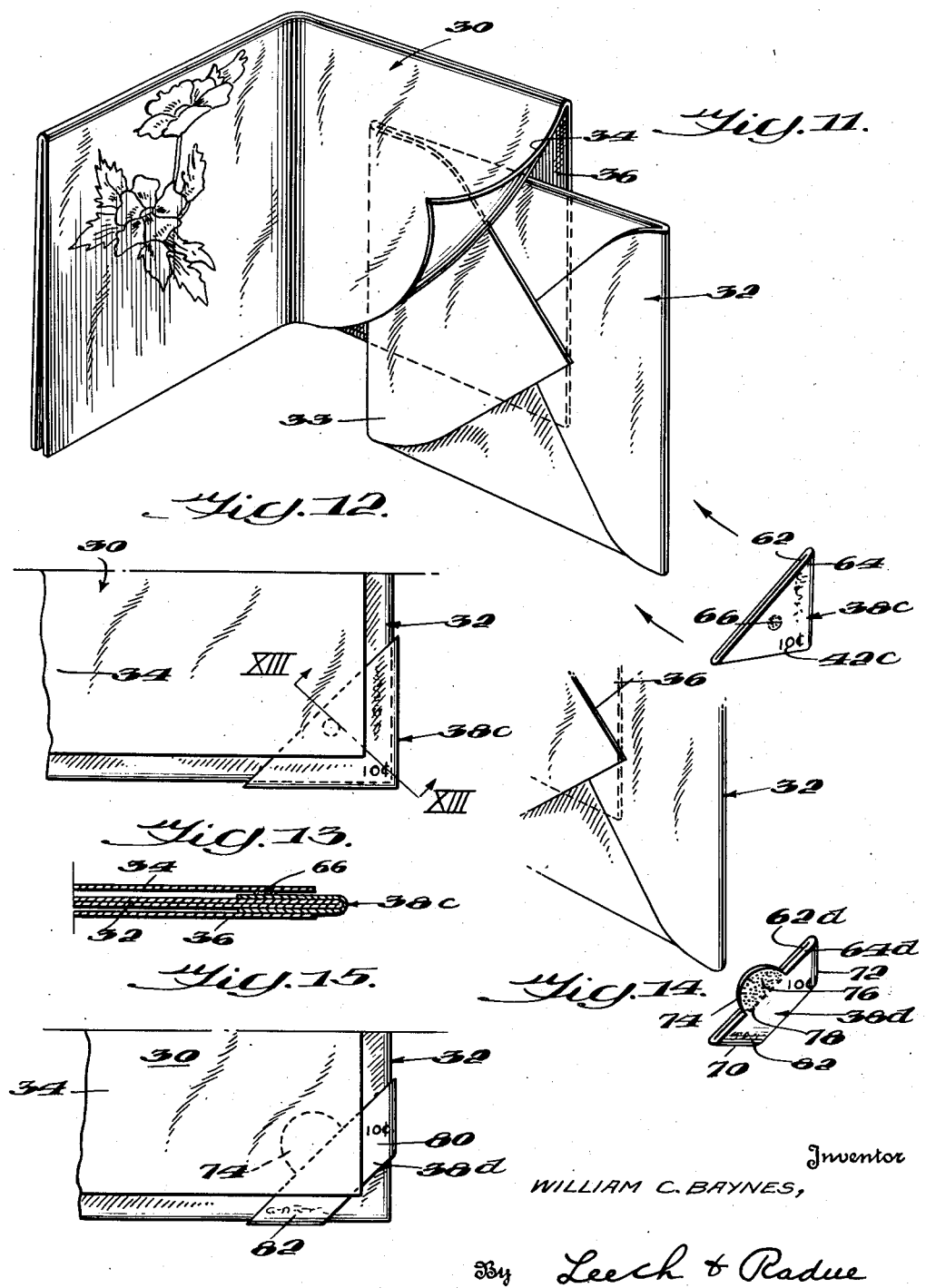
Inventor
WILLIAM C. BAYNES,
By Leech & Radue
Attorneys

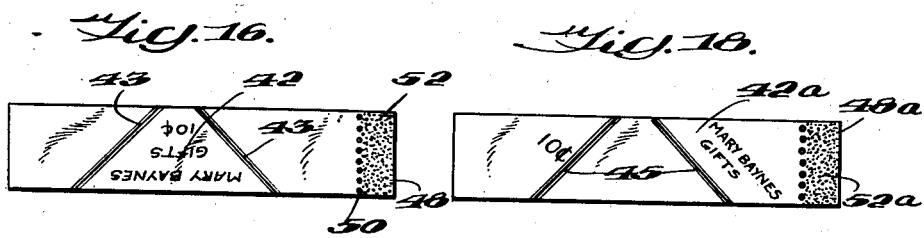
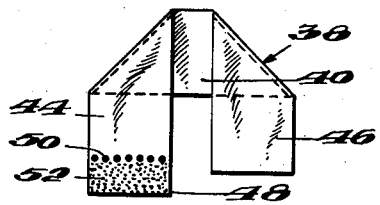
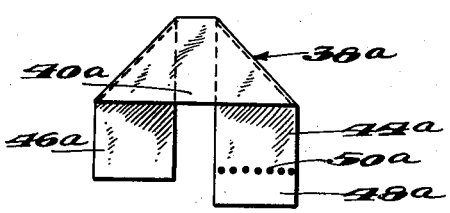
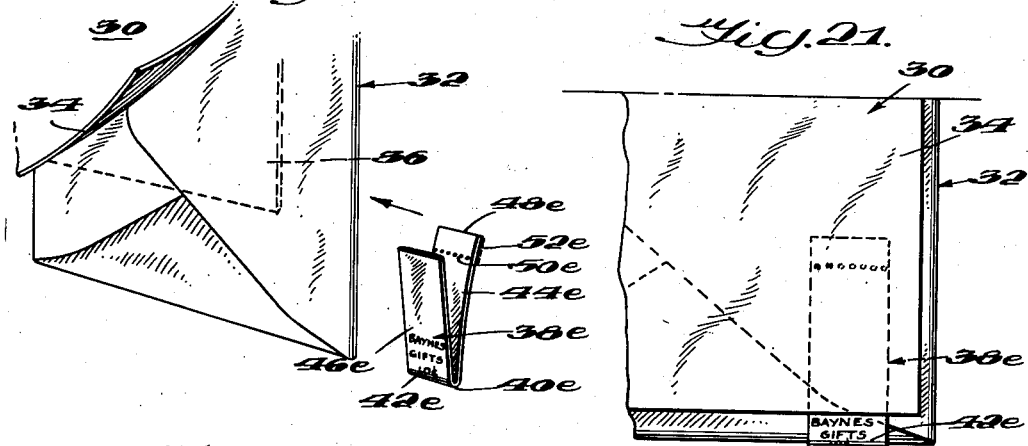
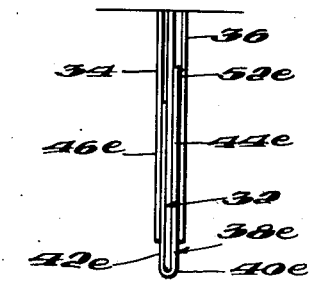
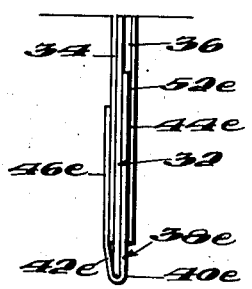
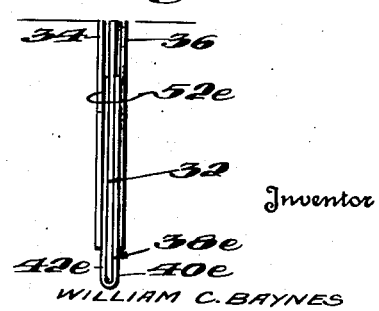

Patented June 16, 1953

2,642,182

UNITED STATES PATENT OFFICE 2,642,182

GREETING CARD AND ENVELOPE ASSEMBLY

William C. Baynes, Washington, D. C.

Application October 23, 1947, Serial No. 781,579

2 Claims. (Cl. 206—63)

This invention relates to improvements in the corner assembly of greeting cards and envelopes whereby the card and envelope are maintained in the desired relation for retail selling and provision is made at the same time for price marking and the name of the individual retailer.

The extremely large volume of greeting card sales and the amazing growth in size of the business of small retailers of greeting cards have called for more efficient and more satisfactory means of price marking and associating a greeting card with the envelope therefor. It is wholly unsatisfactory to apply the price to cartons from which the cards and their matched envelopes are taken by a customer because the cards are frequently returned to the wrong carton and the envelopes tend to become separated and soiled by handling and dropping. The direct application of price designation to individual cards or their envelopes is slow and tedious and quite objectionable because of defacement and the need for erasure at the time of sale. Present practices include the association of greeting cards and their envelopes by means of metallic clips which hold a price ticket against a face of the card which is ordinarily examined by a prospective buyer. While reasonably efficient machines have been provided for such clip ticket associating, the cards tend to become marred by indentation or bending produced by the metallic clip, and often the clip itself becomes corroded and marks the card so as to render it unsalable. Such clipping machines involve a substantial capital investment by the card retailer and substantial added overhead costs in the way of clip material and labor.

It is therefore the principal object of this invention to provide a simple and secure assembly of conventional greeting card and conventional envelope by means of a small corner member of paper or the like carrying the price and any other desirable printing matter adhesively secured to an unexposed or undecorated face of the card and readily detachable from the card and envelope at the time of sale.

Where the word "card" is used herein it is intended to mean any conventional card such as those formed by a single sheet, folded sheets, French-folded sheet cards, and other flat cards, except where a more limited meaning is ascribed. Likewise, the term "envelope" is to be taken in a broad sense to include any conventional type flat envelope which is suitable for the purpose, unless specially qualified.

In accordance with a preferred embodiment of this invention a French-folded greeting card is associated with a conventional envelope of normally greater length and width by means of a paper-like corner member which is folded to provide a retaining pocket for an extending corner of the envelope. In the preferred assembly with such a card, the envelope is inserted between the back two sheets of the card and the corner member is secured in place by an adhesively coated portion arranged to engage a concealed surface of the card. The corner member provides exposed surfaces extending beyond the lower right hand corner of a card having its vertical fold line on the left side, which surfaces will carry the price marking and any desired proprietary designation.

The most inexpensive and preferred form of the corner member is formed from a relatively thin rectangular strip of paper or the like and requires only two simple, symmetrically disposed bends in its formation. Preferably the adhesive is carried on an end portion of the thus formed corner member and scoring, perforation, or similar weakening provision is made for its detachment when the corner member is removed and the card and envelope separated at the time of sale.

Further extensions and modifications of this corner member principle include a corner member formed as a triangular pocket having an opening slit on its hypotenuse and provided with a small adhesive area on a face adapted to engage an unexposed surface of a French-folded card. In this modification, the adhesive may be carried by a detachable tab portion as in the principal embodiment, and the apex may be removed so that the envelope corner protrudes.

In a still further modification the corner member is reduced to its simplest form by the single folding on itself of a preferably rectangular paper strip so as to provide an extending portion at one end carrying adhesive on its card-engaging face and constructed for ready separation from the remaining portion of the corner member.

While this invention is concerned primarily with various assemblies of greeting cards and their envelopes with a corner member of the character indicated, invention as articles of manufacture also resides in the corner members in prepared blank form and also folded to provide a finished corner member.

These and other features of improvement contributing to economy in manufacture, simplicity in use and commercial acceptability of the greeting card and envelope assembly will be more apparent from the following detailed description of preferred embodiments of this invention taken in connection with the accompanying drawings, in which Fig. 1 is a partially exploded perspective view of a French-folded card, its envelope, and the retaining corner member with which they are associated;

Fig. 2 is a fragmentary perspective view showing the assembled relation of the corner member to the normally unexposed surface of the back sheet of the greeting card;

Fig. 3 is an enlarged fragmentary elevation showing the card, envelope and corner member in completely assembled relation;

Fig. 4 is a cross-sectional view taken on line IV—IV of Fig. 3;

Fig. 5 is a partially exploded and fragmentary view of the same greeting card and envelope with a slightly modified corner member;

Fig. 6 is a fragmentary enlarged elevation of the card, envelope and corner member of Fig. 5 in assembled relation;

Fig. 7 is an enlarged cross-sectional view of the assembly of Fig. 6 taken on line VII—VII;

Fig. 8 is an elevational view of a different form of greeting card in assembled relation with its envelope and two corner members;

Fig. 9 is a plan view showing in blank form the corner member used in the modification in Fig. 8;

Fig. 10 is a plan view of the blank of Fig. 9 folded to form a completed corner member;

Fig. 11 is an exploded perspective view of a French-folded greeting card and its envelope with a corner member formed as a two-layer triangular pocket;

Fig. 12 is a fragmentary elevation to an enlarged scale showing the assembly of the card, envelope and corner member of Fig. 11;

Fig. 13 is a cross-sectional view of the assembly taken on line XIII—XIII of Fig. 12;

Fig. 14 is a fragmentary perspective view of a French-folded card, its envelope and a variation of the triangular corner member of Fig. 11;

Fig. 15 is a fragmentary elevation of the card, envelope and corner member of Fig. 14 in final assembled relation;

Fig. 16 is a plan view of the blank used for the corner member of Fig. 1;

Fig. 17 is a plan view from the reverse side of the blank of Fig. 16 after it has been folded to define a corner member;

Fig. 18 is a plan view of the blank of a corner member corresponding to that of Fig. 5;

Fig. 19 is a plan view of the blank of Fig. 18 as seen from the opposite side and folded to form the corner member;

Fig. 20 is a fragmentary exploded perspective view showing a French-folded card, its envelope and a different form of corner member;

Fig. 21 is a partial elevation to enlarged scale of the card, envelope and corner member of Fig. 20 in final assembled relation;

Fig. 22 is a fragmentary end view of the assembly of Fig. 21;

Fig. 23 is a corresponding end view showing a slightly different arrangement of the corner member with respect to the card; and Fig. 24, which is a corresponding end elevation of a card, envelope and corner member assembly, shows a still further modification.

In the preferred embodiment of the invention shown in Figs. 1 to 4, a conventional greeting card 30 of the French-folded type is associated with an envelope 32 which will necessarily be slightly larger in its length and breadth than the card, said card comprising an inner fold or layer 34 and an outer fold or layer 36. The card 30 and envelope 32 are maintained securely in the desired assembled relation by a corner member 38, as shown best in Fig. 3.

The corner member 38 may be formed of any sheet-like material having sufficient stiffness, although ordinary paper strips of elongated rectangular shape are preferred. This member 38 is folded to provide a connecting strip 40 of approximately triangular shape bearing price and other indicia 42, a leg strip 44 and a leg strip 46 projecting in spaced parallel relation as extensions of the corresponding sides of the connecting strip 40. The leg strip 44 may be slightly longer than leg strip 46 and provides an extension or tab 48 which is readily detachable by means of the transverse line of perforations 50. The under face of the tab portion 48, as seen in Figs. 1 and 2, is provided with a coating 52 of any suitable adhesive.

In assembly, the corner member 38 may first be placed over the lower right corner of the envelope 32 in such a manner that when the envelope is inserted between the layers or sheets 34 and 36 of the card 30, the adhesive coating 52 will be in engagement with the inner surface of the back sheet 36, which surface is normally unexposed. After the adhesive layer 52 has been activated, as by the application of moisture, heat, pressure, etc., the card 30 and envelope 32 will be securely assembled in the relation shown in Fig. 3. The upper end of the envelope 32 is also anchored with its left corner coinciding with the intersection of the two folds of the French-folded card.

This arrangement supports the horizontal edge of the envelope 32 adjacent its free projecting corner portion and permits the card and envelope to be picked up together for inspection without any danger of separation and with the indicia 42 clearly visible to the would-be purchaser. After a sale has been made, a downward and outward pull on the envelope 32 will break the line of perforations 50 leaving the tab extension 48 on the unexposed surface of the card and permitting separation of card and envelope with removal of the price marking.

While the assembled relation of the envelope 32 with its closure flap innermost is preferred, it will be understood that the envelope can be turned over or have its other edge inserted in the vertical fold of the card.

The adhesive of layer 52 may be any one of a large variety which are commercially available, such as the moisture-activated or pressure-sensitive types, a principal requirement being that the adhesive selected will not appreciably wet and thus mar or otherwise damage the card to which it is directly connected. The leaving of the tab extension 48 adhered to the unexposed surface of the outer card layer 36 is desirable as it presents a smooth surface rather than a rough, less sightly one of adhesive, as would be the case if the adhesive bond were peeled or broken when the corner 38 was completely removed.

In the card and envelope assembly illustrated in Figs. 5, 6 and 7, a slightly modified corner member 38a is employed. In this corner member the leg strips 44a and 46a are arranged so as to be partially visible when the assembly is viewed from the front in normal fashion, as in Fig. 6. Accordingly, the price and other indicia 42a are placed on the exposed portion of these strips rather than on the connecting strip 40 which is no longer visible. The leg strip 44a is provided, as before, with a tab extension 48a connected by a transverse line of perforations 50a. It is to be particularly noted that the adhesive layer 52a is on the upper face of the corner member 38a, as viewed in Fig. 5, in order that it may be secured to the unexposed face of the inner card fold 34, rather than the outer fold, as was the case in the Fig. 1 embodiment. As it is less desirable to have the adhesive coated tab 48a remain on the envelope, this rearrangement again places it on an unexposed surface and at a sufficient distance inward from the lower right corner of the card 32 to insure a stable assembly. A slight advantage may be obtained with this transposition by using the connecting strip 40a to lock the corner of the outer card fold 36 in position, although this is not absolutely essential.

A comparison of the relative length of the leg strips for corner members 38 and 38a shows that a perfectly satisfactory arrangement can be achieved with leg strips of equal length as provided in Fig. 5.

In Figs. 8, 9 and 10, a corner member 38b, corresponding closely to 38a of Fig. 5, is employed somewhat differently in the assembly of a greeting card 30b and its envelope 32. It will be observed that the card 30b is of the twofold, cut-out type, which does not provide the convenient unexposed surfaces found in the French-folded card. In order to adapt the corner member of this invention to such a card it is necessary to use a second corner member 38b in diagonally opposite position at the upper left corner of the card and envelope. That is to say, the envelope 32 is not interleaved with the twofold card 30b but the back surface of the latter is placed over the back face of the envelope so as to retain the flap closure 33. The adhesive layers 52b of the respective corner member tabs 48b are arranged to engage the back face of the card 30b. This back face is not ordinarily examined at the time of sale or any other time, so that it is relatively unobjectionable to leave the tabs 48b adhered thereon when the corner members 38b are removed and the card 30b and envelope 32 separated. In view, however, of this exposure of the tabs or extensions 48b, the latter may be die cut to a pleasing configuration and colored or decorated in any way that may be desirable.

As in the case of the corner member of Fig. 6, corner member 38b displays the printing or other indicia 42b on the exposed faces of the leg strips 44b and 46b where viewable by the customer when the card and envelope are picked up in the normal manner for inspection. The corner member 38b arranged in the manner described does not interfere with the opening of the twofold card 30b for inspection of the sentiment which usually appears on the inner face of the back fold.

The blank from which the corner member 38b is formed and the simple twofold operation required to complete the corner member from the blank have been generally described and are clearly illustrated by Figs. 9 and 10.

In Figs. 11, 12 and 13, another pocket form of corner member 38c is used to maintain a French-folded card 30 and its envelope 32 in assembled relation with the envelope between the inner and outer folds 34 and 36 of the card.

Referring to the exploded perspective view of Fig. 11, attention is directed to the two-ply construction of the corner pocket member 38c, which may conveniently and economically be formed from paper. The corner member 38c has adjacent seams or fold lines arranged at right angles to each other and spanned at their ends by an entrance slot defined by layers or plies 62 and 64. An adhesive area or spot 66 on the outer face of the layer 64 is disposed to engage the adjacent unexposed surface of the inner fold 34 after the corner member 38c is slipped over the lower right corner of the envelope 32 and inserted therewith between the folds 34 and 36. In this assembled relation which is shown best in Figs. 12 and 13, the envelope will be securely locked in position by the joint action of the corner member 38c and the engagement of its left and upper edges with the intersecting folds of the French-folded card 30. The indicia 42c are arranged along the marginal portions of the layer 64 so as to be visible when the card and envelope assembly are inspected before sale. The location of the adhesive connection between the card fold 34 and the corner member 38c near the lower corner of the card provides maximum effectiveness against relative turning of card and envelope.

A simple outward diagonal pull on the corner pocket member 38c will break the adhesive connection, releasing the envelope 32 from the card 30 and the corner member from the envelope.

A slightly modified form of the corner pocket member is illustrated in Figs. 14 and 15. In this case a pocket member 38d is formed with folded edges 70 and 72 at right angles to each other so that pocket layers or plies 62d and 64d define opposed slits through which the corner of the envelope 32 extends. A central tab extension 74 on the inner edge of the layer 64d is provided with an adhesive coating 76 and connected by a scored line 78 to said layer.

Fig. 15 shows the arrangement of price and other indicia 80 and 82 on the exposed vertical and horizontal marginal portions of the corner member 38d in its assembled relation to card and envelope.

It will be understood that the adhesive layer or coating 76 is secured to the unexposed face of the card fold 34 and remains thereon when the corner member 38d is separated by an outer downward pull which frees the envelope 32 from the card 30 and the corner member from both.

The detailed nature of the corner members and the blanks from which they are formed will be further explained with reference to Figs. 16 to 19. It is contemplated that the slightly different corner members 38 and 38a represented by Figs. 17 and 19, respectively, will be supplied in the blank form as shown in Figs. 16 and 18, either with or without the price and other indicia 42 and 42a. These blanks may be provided in tablet or other vertically assembled groups so that they may be readily separated and folded either manually or mechanically.

The blank for corner member 38b in Fig. 16 comprises an elongated rectangular strip of paper or the like having the requisite properties and provided with predisposed fold lines 42 and 43 extending across the blank in the right angular relation necessary to form the triangular shaped corner member with extending parallel leg strips. It is to be understood that the fold lines may be produced simply by imprinting, or by scoring, partial indentation and any other way that will influence the strip material to bend in the specified manner.

So also may the tab extension 48 be made detachable by heavy scoring or partial severing as well as by the line of perforations 50. The strips in blank form will be supplied with the layer of adhesive, 52 or 52a, on the proper face.

The relative proportions of the different parts of the corner member are not too critical as long as a corner member is defined which has its folded edges at right angles to each other, preferably with a space to permit projection of the corner of the envelope, and parallel leg strips of sufficient length to provide some anchoring by the clamping action of the card and envelope and to afford space for the adhesive tab 48 or 48a.

It is to be observed that the exemplary pocket corner members 38 and 38a of Figs. 17 and 19 formed by folding the end portions toward each other along the central non-intersecting bend lines, 43, 43 and 45, 45 are shaped as isosceles right triangles truncated at the apex. This apex is open so that the tip of the corner portion may be locked by projection therethrough. The leg strip portions 44, 46 and 44a, 46a are thus given added spacing in order that the corner members 38 and 38a will act more efficiently.

The corner member of this invention has been reduced to its simplest form in the modification illustrated by Figs. 20 to 24. Referring to Fig. 20, a corner or envelope retaining member 38e is formed by a single folding of a rectangular strip of paper to provide a long leg 44e and a short leg 46e in superposed relation. The long strip 44e has a transverse line of perforations 50e near its end defining an extension or tab 48e coated with an adhesive 52e on its outer face. This configuration defines a pocket or loop 40e between the superposed legs for receiving a portion of the outer projecting corner of envelope 32, as shown best in Fig. 21. The envelope 32 is interleaved as before between the inner and outer folds or sheets 34 and 36 of the French-folded card 30. This arrangement presents a marginal portion of the corner member 38e beyond the lower edge of the card so that price or other indicia 42e will be plainly visible when the card is normally inspected, closed or opened. It is necessary that at least one of the leg strips or plies 44e and 46e be inserted between the two back sheets 34 and 36 of the card. By preference both strips are thus inserted as shown in Fig. 22, with the longer strip 44e having a direct adhesive connection with the unexposed face of the back sheet 36 of the card. The unsecured leg strip 46e is quite adequately retained by the inner sheet 34 of the opened card and even more securely when the card 30 is in completely closed relation.

The efficiency of the supporting action of the envelope retaining members 38e increases with the distance from the vertical fold of the card 30. It will be apparent that the more remote the member 38e is from the vertical fold line, the greater will be the lever by which it supports.

As the paper or similar material used for the corner member 38e has at least a moderate degree of stiffness, it is also possible to position the shorter unsecured leg 46e over the exposed face of the inner card fold 34 in the manner illustrated by the end view of Fig. 23. After creasing of the connecting bend or pocket 40e, the unsecured strip 46e will have a tendency to hug the surface which it overlies and will normally be clamped somewhat by the card 30 when it is completely closed.

The card, envelope, and pocket corner assembly shown by the fragmentary end view of Fig. 24 involves only a slight modification of the arrangement shown in Figs. 21 and 22, it being noted that in the case of Fig. 24, the strips of the member 38e are of equal length and the adhesive layer 52e connects with the unexposed surface of the inner card fold 34.

The card 30, envelope 32 and pocket member 40e can be most readily separated from each other by grasping the indicia bearing portion 42e so as to squeeze together the member 40e and the envelope 32, whereupon a slight downward pull will accomplish the separation, leaving the tab extension 48e adhered to the unexposed face of the card fold 36.

Although preferred embodiments and several modifications of the greeting card and envelope assembly of this invention and the essential corner member have been described in considerable detail, it will be understood that numerous other variations may be made in details of structure, proportions, and arrangement of parts without departure from the principles of the invention and the scope of the appended claims.

The present application is a continuation in part of application Serial No. 749,748, filed May 22, 1947, now Patent No. 2,497,064.

Having thus described my invention, what I claim as novel and desire to secure by Letters Patent of the United States is:

1. The combination comprising a French-folded greeting card, an envelope of greater dimension than the card interleaved between the two sheets of said card with adjacent edges of the envelope respectively abutting the horizontal and vertical folds of said card when the card is closed, a separate envelope retaining member for supporting the projecting horizontal edge portion of the envelope at a point remote from the vertical fold of the card, said member being formed by an elongated flexible strip bent on itself to provide two overlying legs and arranged so that said horizontal edge portion of the envelope rests in the bent portion between the two legs and the legs engage the opposite sides of the envelope under the sheets of said card, and a direct adhesive connection between one leg of said member and the adjacent unexposed face of the card, said member having price indicia on a portion not covered by the card.

2. The combination comprising a French-folded greeting card, an envelope of greater dimension than the card interleaved between the two sheets of said card with adjacent edges of the envelope respectively abutting the horizontal and vertical folds of said card when the card is closed, a separate paper-like envelope retaining member of at least two plies having a connecting fold, said retaining member being remote from the vertical fold of the card and arranged to receive a portion of the horizontal edge of the envelope that is remote from said vertical fold in the fold between said plies with one of said plies engaging each side of the envelope under the sheets of said card, and a direct adhesive connection between one of said plies and the adjacent unexposed face of the card, said retaining member having price indicia on a portion not covered by the card.

WILLIAM C. BAYNES.

References Cited in the file of this patent

UNITED STATES PATENTS

| Number | Name | Date |
|---|---|---|
| 949,201 | Shaw | Feb. 15, 1910 |
| 1,756,216 | Seeley | Apr. 29, 1930 |
| 1,994,673 | Steinthal | Mar. 19, 1935 |
| 2,059,092 | Donovan | Oct. 27, 1936 |
| 2,292,924 | Bourke | Aug. 11, 1942 |
| 2,323,653 | Fowler, Jr. | July 6, 1943 |
| 2,336,867 | Huber | Dec. 14, 1943 |
| 2,350,149 | Coakley, Jr. | May 30, 1944 |